United States Patent
Pinarbasi (10) Patent No.: US 6,859,348 B2
(45) Date of Patent: Feb. 22, 2005

(54) HARD BIASED SELF-PINNED SPIN VALVE SENSOR WITH RECESSED OVERLAID LEADS

(75) Inventor: Mustafa Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 119 days.

(21) Appl. No.: 10/104,657

(22) Filed: Mar. 21, 2002

(65) Prior Publication Data

US 2003/0179509 A1 Sep. 25, 2003

(51) Int. Cl.$^7$ ................................................. G11B 5/39
(52) U.S. Cl. ....................................................... 360/322
(58) Field of Search ............................... 360/322, 320, 360/324.1 L, 324.1, 324.11

(56) References Cited

U.S. PATENT DOCUMENTS

| | | | | | |
|---|---|---|---|---|---|
| 6,007,731 A | * | 12/1999 | Han et al. | ...................... | 216/22 |
| 6,127,053 A | * | 10/2000 | Lin et al. | .................... | 428/692 |
| 6,134,090 A | * | 10/2000 | Mao et al. | ............... | 360/324.1 |
| 6,266,218 B1 | * | 7/2001 | Carey et al. | ............ | 360/324.12 |
| 6,313,973 B1 | * | 11/2001 | Fuke et al. | ............... | 360/324.1 |
| 6,344,953 B1 | * | 2/2002 | Kautzky et al. | ............ | 360/322 |
| 6,570,745 B1 | * | 5/2003 | Gill | ........................ | 360/324.12 |
| 6,643,107 B1 | * | 11/2003 | Hasegawa et al. | ....... | 360/324.1 |

* cited by examiner

Primary Examiner—Angel Castro
(74) Attorney, Agent, or Firm—Ervin F. Johnston (57) ABSTRACT

A spin valve sensor has an antiparallel (AP) pinned layer structure which has ferromagnetic first and second AP pinned layers that are separated by an antiparallel coupling layer. The first and second AP pinned layers are self-pinned antiparallel with respect to one another without the assistance of an antiferromagnetic (AFM) pinning layer. First and second hard bias layers interface first and second side surfaces of the spin valve sensor and the sensor has a central portion that extends between the first and second hard bias layers. First and second lead layers overlay the first and second hard bias layers and overlay first and second end portions of the central portion so that a distance between the first and second lead layers defines a track width that is less than a distance between the first and second hard bias layers. A cap layer structure has a full thickness portion between first and second reduced thickness portions and the first and second lead layers engage the cap layer structure within the first and second reduced thickness portions.

14 Claims, 6 Drawing Sheets

FIG. 9 (PRIOR ART)
(ABS)

HARD BIASED SELF-PINNED SPIN VALVE SENSOR WITH RECESSED OVERLAID LEADS

BACKGROUND OF THE INVENTION

1. Field of the Invention

The present invention relates to a hard biased self-pinned spin valve sensor with recessed overlaid leads and, more particularly, to such a sensor wherein first and second leads are recessed in first and second reduced thickness portions of a cap layer structure so that the resistance between the leads and the sensor is reduced.

2. Description of the Related Art

The heart of a computer is a magnetic disk drive which includes a magnetic disk, a slider that has read and write heads, a suspension arm and an actuator arm that swings the suspension arm to place the read and write heads adjacent selected circular tracks on the disk when the disk is rotating. The suspension arm biases the slider into contact with the surface of the disk or parks it on a ramp when the disk is not rotating but, when the disk rotates and the slider faces the rotating disk, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic field signals to and reading magnetic field signals from the rotating disk. The read and write heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer typically interfaces the pinned layer structure for pinning a magnetic moment of the pinned layer structure 90° to the air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer structure with the sense current conducted through the sensor in the absence of field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a bottom spin valve sensor or a top spin valve sensor depending upon whether the pinned layer is located near the bottom of the sensor close to the first read gap layer or near the top of the sensor close to the second read gap layer. Spin valve sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel to one another. Spin valve sensors are still further classified as single or dual wherein a single spin valve sensor employs only one pinned layer and a dual spin valve sensor employs two pinned layers with the free layer structure located therebetween.

As stated hereinabove, a magnetic moment of the aforementioned pinned layer structure is pinned 90° to the ABS by the aforementioned antiferromagnetic (AFM) pinning layer. After deposition of the sensor, the sensor is subjected to a temperature at or near a blocking temperature of the material of the pinning layer in the presence of a field which is oriented perpendicular to the ABS for the purpose of resetting the orientation of the magnetic spins of the pinning layer. The elevated temperature frees the magnetic spins of the pinning layer so that they align perpendicular to the ABS. This also aligns the magnetic moment of the pinned layer structure perpendicular to the ABS. When the read head is cooled to room temperature the magnetic spins of the pinning layer are fixed in the direction perpendicular to the ABS which pins the magnetic moment of the pinned layer structure perpendicular to the ABS. After resetting the pinning layer it is important that subsequent elevated temperatures and extraneous magnetic fields do not disturb the setting of the pinning layer.

It is also desirable that the pinning layer be as thin as possible since it is located within the track width of the sensor and its thickness adds to an overall gap length between the first and second shield layers. It should be understood that the thinner the gap length the higher the linear read bit density of the read head. This means that more bits can be read per inch along the track of a rotating magnetic disk which enables an increase in the storage capacity of the magnetic disk drive.

A scheme for minimizing the aforementioned gap between the first and second shield layers is to provide a self-pinned AP pinned layer structure. The self-pinned AP pinned layer structure eliminates the need for the aforementioned pinning layer which permits the read gap to be reduced by 120 Å when the pinning layer is platinum manganese (PtMn). In the self-pinned AP pinned layer structure each AP pinned layer has an intrinsic uniaxial anisotropy field and a magnetostriction uniaxial anisotropy field. The intrinisic uniaxial anisotropy field is due to the intrinsic magnetization of the layer and the magnetostriction uniaxial anisotropy field is a product of the magnetostriction of the layer and stress within the layer. A positive magnetostriction of the layer and compressive stress therein results in a magnetostriction uniaxial anisotropy field that can support an intrinsic uniaxial anisotropy field. The orientations of the magnetic moments of the AP pinned layers are set by an external field. This is accomplished without the aforementioned elevated temperature which is required to free the magnetic spins of the pinning layer.

If the self-pinning of the AP pinned layer structure is not sufficient, unwanted extraneous fields can disturb the orientations of the magnetic moments of the AP pinned layers or, in a worst situation, could reverse their directions. Accordingly, there is a strong-felt need to maximize the uniaxial magnetostriction anisotropy field while maintaining a high magnetoresistive coefficient dr/R of the spin valve sensor.

It is also important that the free layer be longitudinally biased parallel to the ABS and parallel to the major planes of the thin film layers of the sensor in order to magnetically stabilize the free layer. This is typically accomplished by first and second hard bias magnetic layers which abut first and second side surfaces of the spin valve sensor. Unfortunately, the magnetic field through the free layer between the first and second side surfaces is not uniform since a portion of the magnetization is lost in a central region of the free layer to the shield layers. This is especially troublesome when the track width of the sensor is sub-micron. End portions of the free layer abutting the hard bias layers are over-biased and become very stiff in their response to field signals from the rotating magnetic disk. The stiffened end portions can take up a large portion of the total length of a sub-micron sensor and can significantly reduce the amplitude of the sensor. It should be understood that a narrow track width is important for promoting the track width density of the read head. The more narrow the track width the greater the number of tracks that can be read per linear inch along a radius of the rotating magnetic disk. This enables a further increase in the magnetic storage capacity of the disk drive.

There is a need in the art for reducing the gap length without sacrificing dr/R, reducing the stiffening of the magnetic moment of the free layer when longitudinally biased and mining disturbance of the magnetic moment of the AP pinned layers.

SUMMARY OF THE INVENTION

The spin valve sensor has a central portion which extends between the first and second hard bias (H.B.) layers. An aspect of the invention is to provide first and second lead layers which overlay the first and second hard bias layers respectively and further overlay first and second portions respectively of the central portion of the spin valve sensor so that a distance between the first and second lead layers defines a track width of the sensor that is less than a distance between the first and second hard bias layers. With this arrangement the track width can be reduced while keeping high amplitude. A spin valve sensor further includes a cap layer structure which typically includes a layer of tantalum (Ta). Another aspect of the invention is to provide the cap layer structure with a full thickness portion which is located between first and second reduced thickness portions with the first and second lead layers engaging the cap layer structure within the first and second reduced thickness portions. Since tantalum (Ta) has a high resistance the reduced thickness portions provide less resistance between the first and second lead layers and the sensor for conducting the sense current therethrough.

Another aspect of the invention is to provide a self-pinning antiparallel (AP) pinned layer structure without an AFM pinning layer pinning the AP pinned layer structure. The self-pinning is accomplished by uniaxial anisotropies of the AP pinned layers which are oriented perpendicular to the ABS and, in combination, self-pin the magnetic moments of the first and second AP pinned layers perpendicular to the ABS and antiparallel with respect to each other. The present invention preferably employs cobalt iron (CoFe) for each of the first and second AP pinned layers.

An object is to provide a spin valve sensor with a self-biased AP pinned layer structure, a more uniformly biased free layer, a narrow track width and wherein amplitude output of the sensor is improved.

Another object is to increase the track width density of the sensor and improve the linear bit density of the sensor by reducing the stack height of the sensor.

Another object is to provide the aforementioned spin valve sensor wherein first and second lead layers engage first and second reduced thickness portions of a cap layer structure for reducing the resistance between the lead layers and the spin valve sensor.

A further object is to provide a method for making the aforementioned spin valve sensors.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
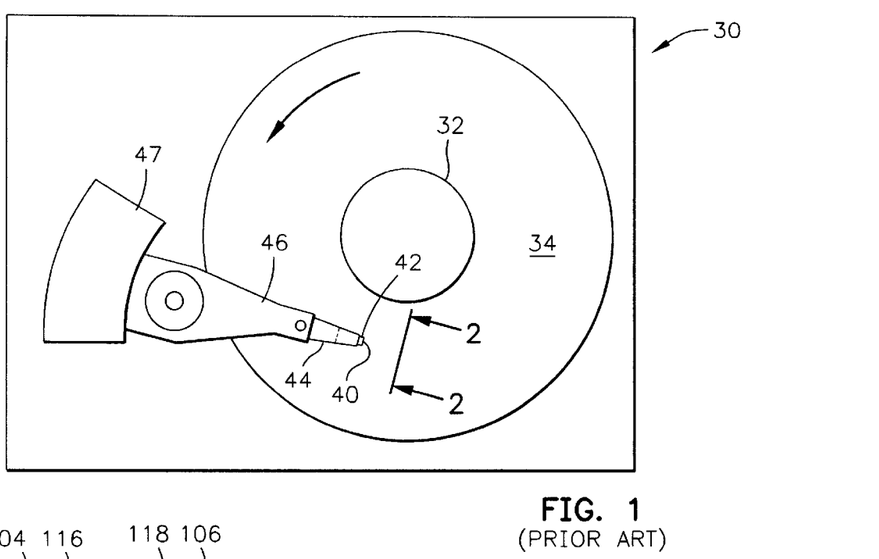
FIG. 1 is a plan view of an exemplary prior art magnetic disk drive.
Figure 2:
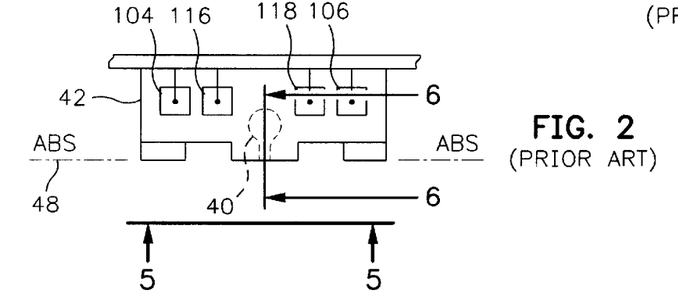
FIG. 2 is an end view of a slider with a magnetic head of the disk drive as seen in plane 2—2 of FIG. 1.
Figure 3:
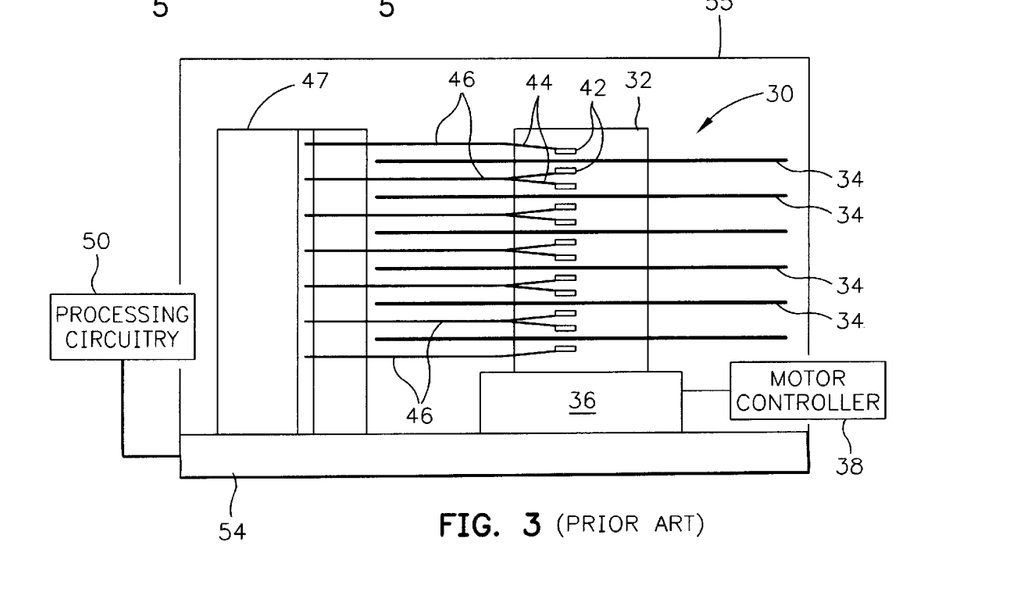
FIG. 3 is an elevation view of the magnetic disk drive wherein multiple disks and magnetic heads are employed.
Figure 4:
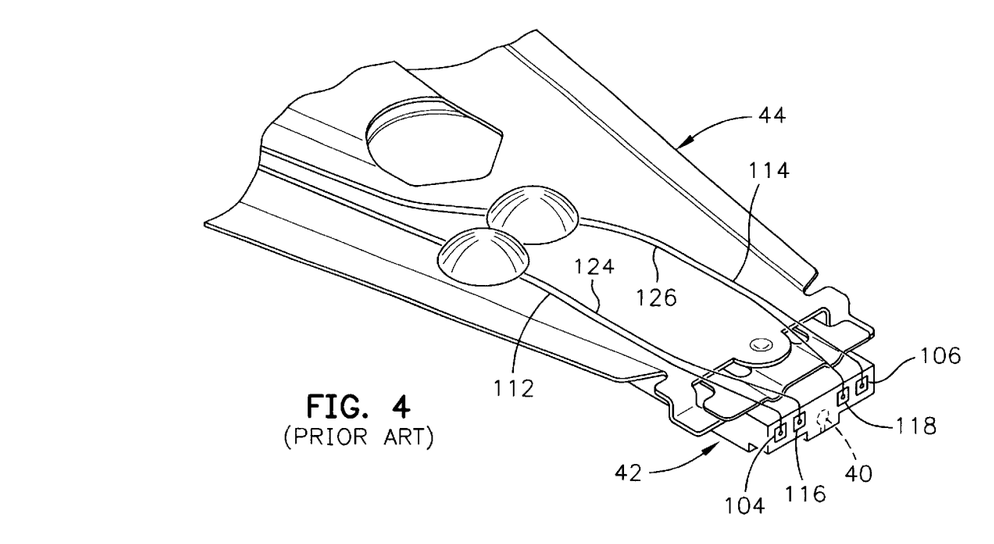
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
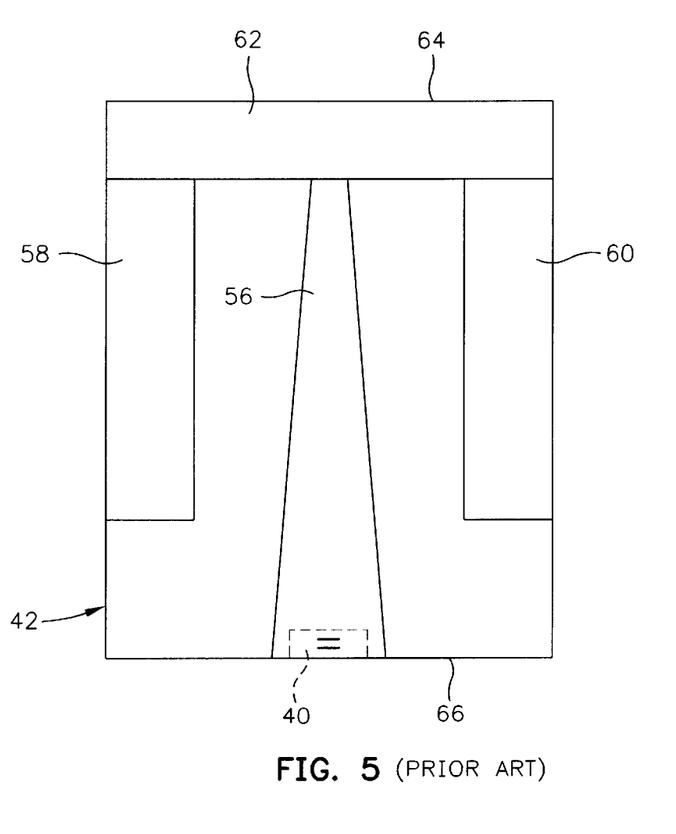
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
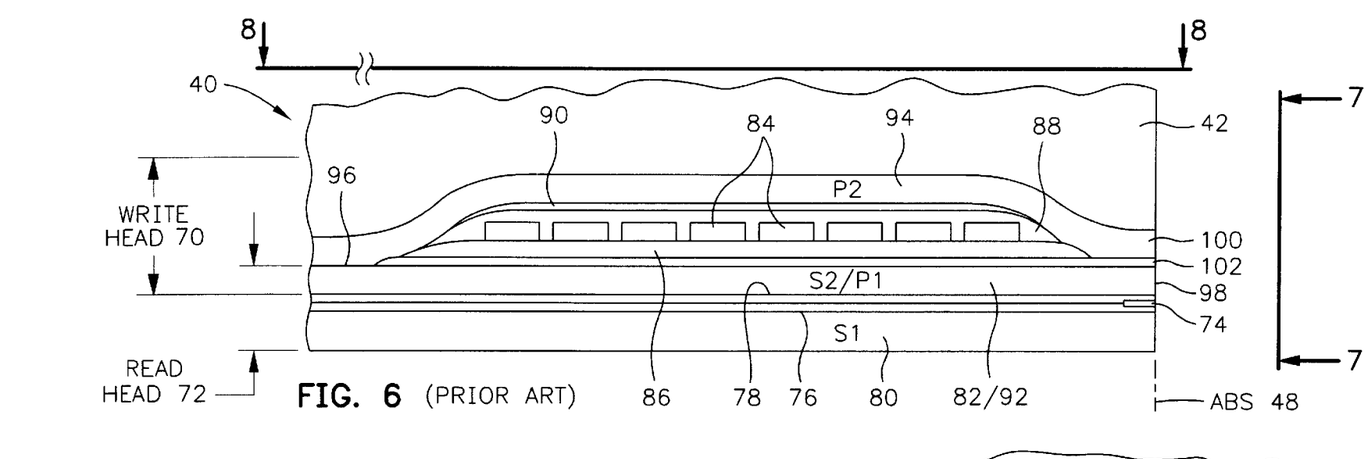
FIG. 6 is a partial view of the slider and a merged magnetic head as seen in plane 6—6 of FIG. 2.
Figure 7:
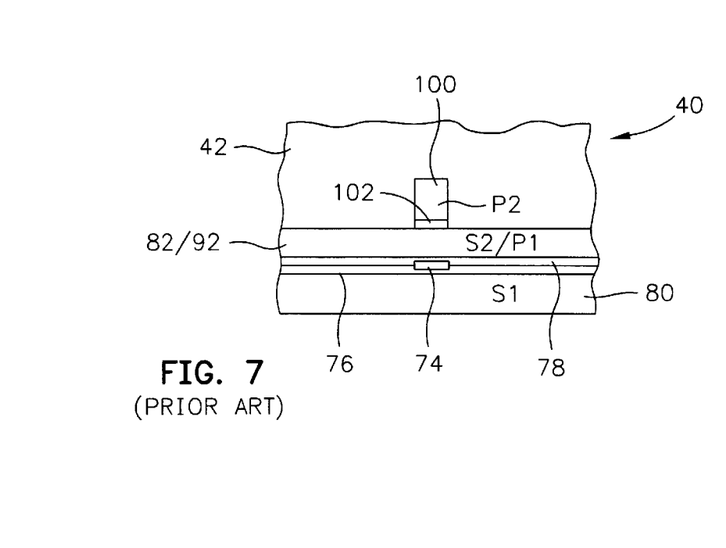
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 8:
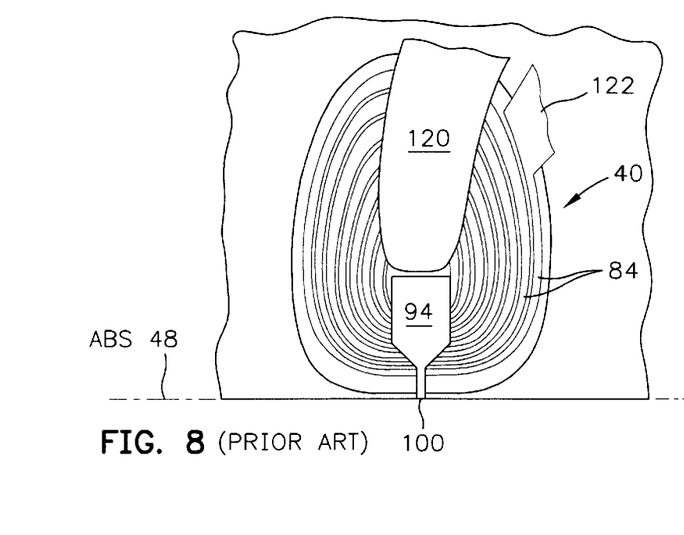
FIG. 8 is a view taken along plane 8—8 of FIG. 6 with all material above the coil layer and leads removed.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
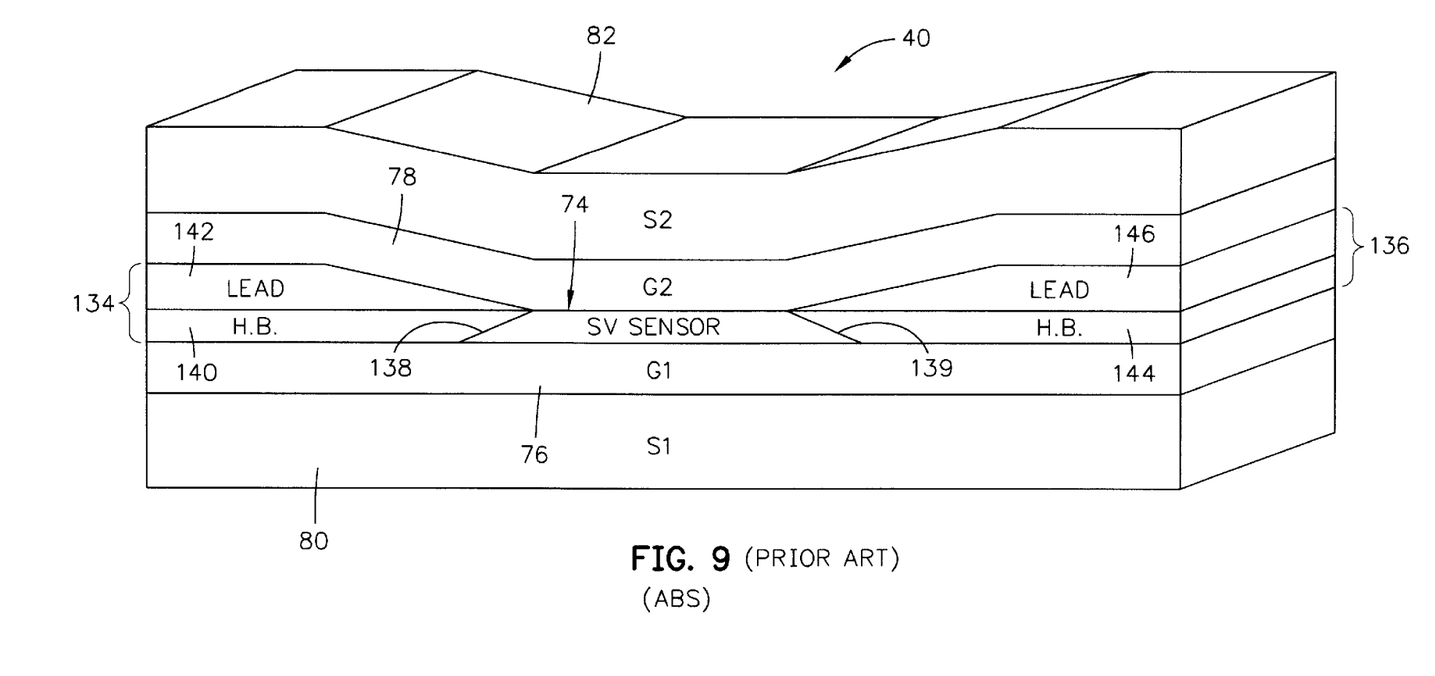
FIG. 9 is an enlarged isometric ABS illustration of the read head with a prior art spin valve sensor.

FIG. 9 is an isometric ABS illustration of the read head 40 shown in FIG. 7. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78 and the first and second read gap layers 76 and 78 are, in turn, located between the ferromagnetic first and second shield layers 80 and 82.

Unfortunately, the first and second hard bias layers 140 and 144 in FIG. 9 do not uniformly stabilize a free layer within the sensor 74. Hard bias layers typically stiffen the magnetic moment of the free layer at end portions of the sensor abutting the hard bias layers so that these portions are stiff in their response to field signals from the rotating magnetic disk. With submicron track widths, the loss amplitude at each end of the sensor is unacceptable.

The Invention

Figure 10:
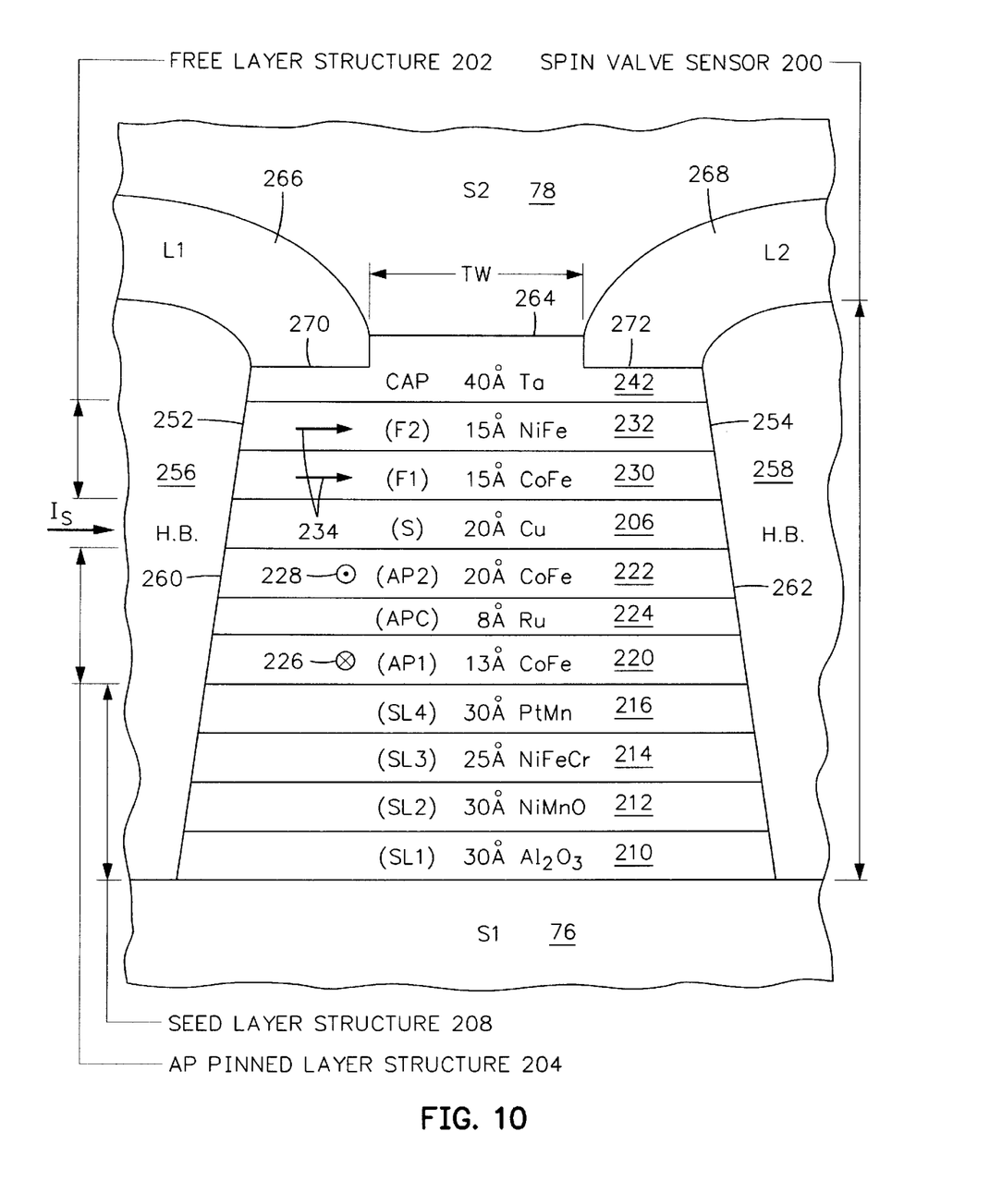
FIG. 10 is an ABS view of one embodiment of the present spin valve sensor.

One embodiment of the present spin valve sensor 200 is illustrated in FIG. 10 wherein the spin valve sensor is located between the first and second read gap layers 76 and 78. The spin valve sensor 200 includes a free layer structure 202 and an antiparallel (AP) pinned layer structure 204. A nonmagnetic electrically nonconductive spacer layer (S) 206 is located between the free layer structure 202 and the AP pinned layer structure 204. Because the free layer structure 202 is located between the AP pinned layer structure 204 and the second read gap layer 78 the spin valve sensor 200 is a bottom spin valve sensor. A seed layer structure 208 may be located between the first read gap layer 76 and the AP pinned layer structure 204. The seed layer structure 208 may include first, second, third and fourth seed layers (SL1), (SL2), (SL3) and (SL4) 210, 212, 214 and 216. The seed layers, with the thicknesses and materials shown, have been found to promote a desirable texture of the layers deposited thereon.

It should be noted that the spin valve sensor 200 does not include the typical antiferromagnetic (AFM) pinning layer for pinning magnetic moments of the AP pinned layer structure 204. An aspect of the invention is to provide an AP pinned layer structure 204 which is self-pinning. The AP pinned layer structure 204 includes ferromagnetic first and second AP pinned layers (AP1) and (AP2) 220 and 222. A nonmagnetic electrically conductive antiparallel coupling (APC) layer 224 is located between and interfaces the first and second AP pinned layers 220 and 222. The first AP pinned layer 220 has a magnetic moment 226 which is oriented perpendicular to the ABS in a direction, either toward the ABS or away from the ABS, as shown in FIG. 10, and the second AP pinned layer has a magnetic moment 228 which is oriented antiparallel to the magnetic moment 226 by a strong antiparallel coupling between the first and second AP pinned layers 220 and 222. The preferred material for the first and second AP pinned layers 220 and 222 is cobalt iron (CoFe).

In a preferred embodiment, one of the AP pinned layers is thicker than the other, such as the first AP pinned layer 220 may be 13 Å and the second AP pinned layer 222 may be 20 Å. The direction of the magnetic moment 228, either into or out of the sensor, is determined by the direction in which the magnetic moment 228 is set by an external magnetic field. With the arrangement shown in FIG. 10, the magnetic field has been applied out of the sensor which causes the magnetic moment 228 to be directed out of the sensor. If the external field is reversed in its direction, the magnetic moment 228 would be directed into the sensor. Alternatively, the first AP pinned layer 220 may be thicker than the second AP pinned layer 222 or the thicknesses of the first and second AP pinned layers 220 and 222 may be equal. In the latter instance, the application of an external magnetic field to one or the other of the AP pinned layers 220 and 222 will set the direction of the one AP pinned layer which will, in turn, set the direction of the magnetic moment of the other AP pinned layer antiparallel thereto. When the AP pinned layers 220 and 222 are formed by sputter deposition they are deposited in the presence of a field which is oriented perpendicular to the ABS. In this manner, the easy axes of the first and second AP pinned layers will likewise be oriented perpendicular to the ABS.

The free layer structure 202 may include first and second free layers (F1) and (F2) 230 and 232. It has been found that when the free layer structure 202 has a cobalt iron first free layer 230 between the spacer layer 206 and a nickel iron second free layer 232 that the magnetoresistive coefficient dR/R of the spin valve sensor is increased. The free layer structure has a magnetic moment 234 which is oriented parallel to the ABS and parallel to the major thin film planes of the layers. A sense current $I_S$ is conducted through the spin valve sensor from right to left or from left to right, as shown in FIG. 10. When a field signal from the rotating magnetic disk rotates the magnetic moment 234 into the sensor the magnetic moments 234 and 228 become more antiparallel which increases the resistance of the sensor to the sense current $I_S$ and when a field signal rotates the magnetic moment 234 out of the sensor the magnetic moments 234 and 228 become more parallel which decreases the resistance of the sensor to the sense current $I_S$. These resistance changes change potentials within the processing circuitry 50 in FIG. 3 which are processed as playback signals.

First and second hard bias (H.B.) layers 256 and 258 interface first and second side surfaces 260 and 262 of the spin valve sensor for longitudinally stabilizing the free layer structure 202. As stated hereinabove, end regions of the free layer structure 202 are typically magnetically stiff while the central portion of the free layer structure is more responsive to field signals from the rotating magnetic disk. This is due to the fact that the magnetic flux lines between the first and second hard bias layers 256 and 258 dissipate to some extent into the first and second shield layers 80 and 82 in FIG. 9. The spin valve sensor has a central portion 264 between the first and second hard bias layers 256 and 258. In order to overcome the aforementioned stiffness problem of the free layer structure 202, first and second lead layers 266 and 268 overlay not only the first and second hard bias layers 256 and 258 but also overlay first and second portions 270 and 272 respectively of the central portion so that a distance between the first and second lead layers defines an electrical track width (TW) that is less than a distance between the first and second hard bias layers 256 and 258. This means that the stiffened end portions of the free layer structure 202 are outside of the track width and are not responsive to field signals from the rotating magnetic disk. Accordingly, only a middle portion of the free layer structure 202 responds to field signals from the rotating magnetic disk where the magnetic moment 234 is less stiff in its rotation and therefore responds more freely to the field signals.

An aspect of the invention is that the cap layer 242 has a fill thickness portion which is at 264 and first and second reduced thickness portions which are at 270 and 272 with the full thickness portion being located between the first and second reduced thickness portions. The first and second lead layers 266 and 268 engage the cap structure within the first and second reduced thickness portions 270 and 272. With this arrangement the reduced thickness portions 270 and 272 reduce the resistance between the first and second lead layers 266 and 268 and the spin valve sensor. This is especially important when the cap layer 242 is composed of tantalum (Ta) which has a high resistance.

Exemplary thicknesses of the layers are 30 Å of $Al_2O_3$ for the layer 210, 30 Å of NiMnO for the layer 212, 25 Å of NiFeCr for the layer 214, 30 Å of PtMn for the layer 216, 13 Å of CoFe for the layer 220, 8 Å of Ru for the layer 224, 20 Å of CoFe for the layer 222, 20 Å of Cu for the layer 206, 15 Å of CoFe for the layer 230, 15 Å of NiFe for the layer 232 and 40 Å of Ta for the layer 242. The spin valve sensor in FIG. 10 is known in the art as a bottom spin valve sensor since the free layer structure 202 is located between the AP pinned layer structure 204 and the second read gap layer 78.

Figure 11:
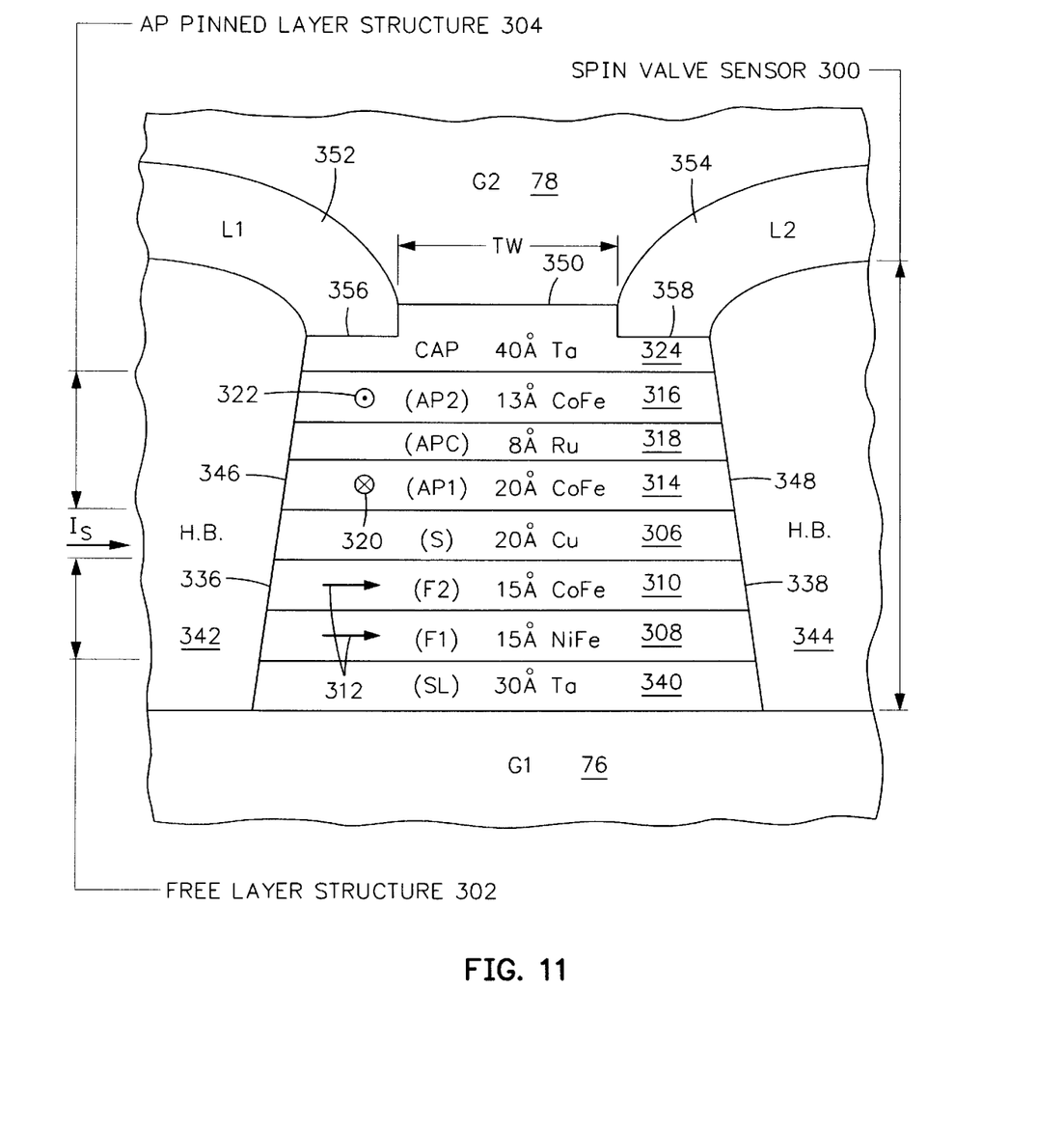
FIG. 11 is an ABS view of another embodiment of the present spin valve sensor.

Another embodiment of the present spin valve sensor 300 is illustrated in FIG. 11. The spin valve sensor 300 includes a free layer structure 302, an antiparallel (AP) pinned layer structure 304 and a nonmagnetic electrically conductive spacer layer (S) 306 which is located between and interfaces the free layer structure 302 and the AP pinned layer structure 304. The free layer structure 302 may have first and second free layers (F1) and (F2) 308 and 310 with the free layer 308 being nickel iron and the free layer 310 being cobalt iron with the cobalt iron being located between a copper spacer layer 306 and the nickel iron free layer 308 for improving the magnetoresistive coefficient dR/R of the sensor. The free layer structure 302 has a magnetic moment 312 which is parallel to the ABS and parallel to the major planes of the sensor in a direction from right to left or from left to right, as shown in FIG. 11.

The AP pinned layer structure 304 includes ferromagnetic first and second AP pinned layers (AP1) and (AP2) 314 and 316 and an antiparallel coupling (APC) layer 318 which is located between and interfaces the first and second AP pinned layers 314 and 316. The AP pinned layers 314 and 316 have magnetic moments 320 and 322 which are oriented perpendicular to the ABS and antiparallel with respect to one another. The first and second AP pinned layers 314 and 316 have uniaxial anisotropies that cause a self-pinning between the first and second AP pinned layers. Since the first AP pinned layer 314 is thicker than the second AP pinned layer 316 it has a greater magnetic moment and will dominate the directions of the magnetic moments 320 and 322. While it is preferred that one of the AP pinned layers be thicker than the other the invention will still operate with first and second AP pinned layers 320 and 322 of equal thickness. The direction of the magnetic moments can be established by applying an outside field to one of the AP pinned layers in a first direction which causes the magnetic moment of the other AP pinned layer to have a second direction which is antiparallel to the first direction. The operation of the spin valve sensor 300 in response to field signals from the rotating magnetic disk is the same as that described hereinabove for the spin valve sensor 200 in FIG. 10. A cap layer 324, which is described in more detail hereinbelow, is located on the AP pinned layer structure 304 for protecting it from subsequent processing steps. A seed layer (SL) 340 may be located between the first read gap layer 76 and the pinning layer 332 for promoting improved texture of the layers deposited thereon. Leads (L1) and (L2) 342 and 344, which are described in more detail hereinbelow, conduct the sense current $I_S$ through the sensor 300.

First and second hard bias (H.B.) layers 342 and 344 interface side surfaces 346 and 348 respectively of the spin valve sensor for longitudinally stabilizing the free layer structure 302. As stated hereinabove, this arrangement renders end portions of the free layer structure magnetically stiff while the magnetic moment 312 in a middle portion of the free layer structure responds more freely to field signals. The spin valve sensor has a central portion 350 that extends between the first and second hard bias layers 342 and 344. In order to reduce the stiff response of the free layer structure 302 first and second lead layers 352 and 354 not only overlay the first and second hard bias layers 342 and 344 but also overlay first and second portions 356 and 358 respectively of the central portion so that a distance between the first and second lead layers defines a track width (TW) that is less than a distance between the first and second hard bias layers. With this arrangement only the middle portion of the free layer structure 302, which is more magnetically soft, responds to field signals from the rotating magnetic disk. Accordingly, the magnetic moment 312 of the free layer structure can be rotated more easily, either upwardly or downwardly within the middle portion so as to make the spin valve sensor more sensitive to the field signals.

An aspect of this invention is that the cap layer 324 has a full thickness portion located at 350 and first and second reduced thickness portions located at 356 and 358 with the full thickness portion being located between the first and second reduced thickness portions. The first and second lead layers 352 and 354 engage the cap layer structure within the first and second reduced thickness portions 356 and 358. As stated hereinabove, this arrangement lessens the resistance between the lead layers and the sensor when the cap layer is a high resistance material such as tantalum (Ta).

Exemplary thicknesses and materials of the layers are 30 Å of Ta for the layer 340, 15 Å of NiFe for the layer 308, 15 Å of CoFe for the layer 310, 20 Å of Cu for the layer 306, 20 Å of CoFe for the layer 314, 8 Å of Ru for the layer 318, 13 Å of CoFe for the layer 316 and 40 Å of Ta for the layer 324.

Discussion

It has been found that by removing the pinning layer for pinning a magnetic moment of the AP pinned layer that the amplitude read output of the read head can be increased 30% to 40%. Further, by uniformly stabilizing the free layer structure the amplitude is still further increased and the track width of the read head can be made more narrow to increase the linear read bit density of the read head.

A method for constructing the reduced thickness portions 270 and 272 in FIG. 10 and the reduced thickness portions 356 and 358 in FIG. 11 is to form a bilayer resist layer on only the desired full thickness portion of the cap layer structure and then ion mill, such as reactive ion etching (RIE), into the cap layer so as to reduce its thickness at each end. While the photoresist layer is still in place the first and second lead layers 352 and 354 may then be sputter deposited so that they fill in the reduced thickness portions of the cap layer structure and cover the first and second AFM layers. The bilayer resist can then be removed by a dissolution process.

The following commonly assigned U.S. patents are incorporated in their entirety by reference herein: (1) U.S. Pat. No. 5,465,185; (2) U.S. Pat. No. 5,583,725; (3) U.S. Pat. No. 5,768,069; (4) U.S. Pat. No. 6,040,961; (5) U.S. Pat. No. 6,117,569; (6) U.S. Pat. No. 6,127,053; and (7) U.S. Pat. No. 6,219,211 B1.

Clearly, other embodiments and modifications of this invention will occur readily to those of ordinary skill in the art in view of these teachings. For instance, the slider supporting the magnetoresistive sensor may have a head surface other than the aforementioned ABS such as a tape surface for use in a tape drive. Therefore, this invention is to be limited only by the following claims, which include all such embodiments and modifications when viewed in conjunction with the above specification and accompanying drawings.

I claim:

1. A magnetic head assembly comprising:
   a read head that includes a magnetoresistive sensor;
   the magnetoresistive sensor including:
   an antiparallel (AP) pinned layer structure;
   a ferromagnetic free layer having a magnetic moment that is free to rotate in response to a field signal; and
   a nonmagnetic electrically conductive spacer layer located between the free layer and the AP pinned layer structure;
   the antiparallel (AP) pinned layer structure including:
   ferromagnetic first and second antiparallel (AP) pinned layers;
   an antiparallel coupling (APC) layer located between and interfacing the first and second AP pinned layers; and
   the first and second AP pinned layers self pinning one another without assistance of an antiferromagnetic (AFM) pinning layer;
   the magnetoresistive sensor having first and second side surfaces;
   first and second hard bias layers interfacing the first and second side surfaces of the magnetoresistive sensor for longitudinally biasing said free layer;
   the magnetoresistive sensor having a central portion that extends between the first and second hard bias layers;
   first and second lead layers overlaying the first and second hard bias layers respectively and overlaying first and second portions respectively of the central portion so that a distance between the first and second lead layers defines a track width of the magnetoresistive sensor that is less than a distance between the first and second hard bias layers;
   a cap layer structure that has a full thickness portion and first and second reduced thickness portions with the full thickness portion located between the first and second reduced thickness portions;
   the cap layer structure being composed only of tantalum (Ta); and
   said first and second lead layers engaging the cap layer structure within said first and second reduced thickness portions.

2. A magnetic head assembly as claimed in claim 1 including:
   nonmagnetic electrically nonconductive first and second read gap layers;

the magnetoresistive sensor being located between the first and second read gap layers;

ferromagnetic first and second shield layers; and the first and second read gap layers being located between the first and second shield layers.

3. A magnetic head assembly as claimed in claim 2 further comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

4. A magnetic head assembly as claimed in claim 3 wherein the free layer is located between the AP pinned layer structure and the first pole piece layer.

5. A magnetic head assembly as claimed in claim 4 wherein the AP pinned layer structure is located between the free layer and the first pole piece layer.

6. A magnetic head assembly comprising:

a read head that includes a magnetoresistive sensor;

the magnetoresistive sensor including:
an antiparallel (AP) pinned layer structure;
a ferromagnetic free layer having a magnetic moment that is free to rotate in response to a field signal; and
a nonmagnetic electrically conductive spacer layer located between the free layer and the AP pinned layer structure;

the antiparallel (AP) pinned layer structure including:
ferromagnetic first and second antiparallel (AP) pinned layers;
an antiparallel coupling (APC) layer located between and interfacing the first and second AP pinned layers; and
the first and second AP pinned layers self pinning one another without assistance of an antiferromagnetic (MM) pinning layer;

the magnetoresistive sensor having first and second side surfaces;

first and second hard bias layers interfacing the first and second side surfaces of the magnetoresistive sensor for longitudinally biasing said free layer;

the magnetoresistive sensor having a central portion that extends between the first and second hard bias layers;

first and second lead layers overlaying the first and second hard bias layers respectively and overlaying first and second portions respectively of the central portion so that a distance between the first and second lead layers defines a track width of the magnetoresistive sensor that is less than a distance between the first and second hard bias layers;

a cap layer structure that has a full thickness portion and first and second reduced thickness portions with the full thickness portion located between the first and second reduced thickness portions;

the cap layer structure being composed only of tantalum (Ta);

said first and second lead layers engaging the cap layer structure within said first and second reduced thickness portions;

nonmagnetic electrically nonconductive first and second read gap layers;

the magnetoresistive sensor being located between the first and second read gap layers;

ferromagnetic first and second shield layers; and the first and second read gap layers being located between the first and second shield layers;

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

7. A magnetic disk drive including at least one magnetic head assembly that has a head surface for facing a magnetic medium and that includes a write head and a read head, comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;

a read including:
nonmagnetic electrically nonconductive first and second read gap layers;
a magnetoresistive sensor located between the first and second read gap layers; and
the first and second read gap layers being located between first and second shield layers;

the magnetoresistive sensor including:
an antiparallel (AP) pinned layer structure;
a ferromagnetic free layer having a magnetic moment that is free to rotate in response to a field signal; and
a nonmagnetic electrically conductive spacer layer located between the free layer and the AP pinned layer structure;

the antiparallel (AP) pinned layer structure including:
ferromagnetic first and second antiparallel (AP) pinned layers;
an antiparallel coupling (APC) layer located between and interfacing the first and second AP pinned layers; and
the first and second AP pinned layers self pinning one another without assistance of an antiferromagnetic (AFM) pinning layer;

the magnetoresistive sensor having first and second side surfaces;

first and second hard bias layers interfacing the first and second side surfaces of the magnetoresistive sensor for longitudinally biasing said free layer;

the magnetoresistive sensor having a central portion that extends between the first and second hard bias layers;

first and second lead layers overlaying the first and second hard bias layers respectively and overlaying first and second portions respectively of the central portion so that a distance between the first and second lead layers defines a track width of the magnetoresistive sensor that is less than a distance between the first and second hard bias layers;

a cap layer structure that has full thickness portion and first and second reduced thickness portions with the full thickness portion located between the first and second reduced thickness portions;

the cap layer structure being composed only of tantalum (Ta); and said first and second lead layers engaging the cap layer structure within said first and second reduced thickness portions;

a housing;

the magnetic medium being supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

8. A magnetic disk drive as claimed in claim 7 wherein the free layer is located between the AP pinned layer structure and the first pole piece layer.

9. A magnetic disk drive as claimed in claim 7 wherein the AP pinned layer structure is located between the free layer and the first pole piece layer.

10. A method of making a magnetic head assembly comprising the steps of:

forming a read head that includes a magnetoresistive sensor;

a making of the magnetoresistive sensor including the steps of:

forming an antiparallel (AP) pinned layer structure;

forming a ferromagnetic free layer that has a magnetic moment that is free to rotate in response to a field signal; and forming a nonmagnetic electrically conductive spacer layer between the free layer and the AP pinned layer structure;

the forming of the antiparallel (AP) pinned layer structure including the steps of:

forming ferromagnetic first and second antiparallel (AP) pinned layers;

forming an antiparallel coupling (APC) layer between and interfacing the first and second AP pinned layers; and the first and second AP pinned layers being further formed to self pin one another without assistance of an antiferromagnetic (AFM) pinning layer;

forming the magnetoresistive sensor with first and second side surfaces;

forming first and second hard bias layers interfacing the first and second side surfaces of the magnetoresistive sensor for longitudinally biasing said free layer;

forming the magnetoresistive sensor with a central portion that extends between the first and second hard bias layers;

forming first and second lead layers overlaying the first and second hard bias layers respectively and further overlaying first and second portions respectively of the central portion so that a distance between the first and second lead layers defines a track width of the magnetoresistive sensor that is less than a distance between the first and second hard bias layers;

forming a cap layer structure that has a full thickness portion and first and second reduced thickness portions with the full thickness portion located between the first and second reduced thickness portions;

the cap layer structure being composed only of tantalum (Ta); and forming said first and second lead layers engaging the cap layer structure within said first and second reduced thickness portions.

11. A method of making a magnetic head assembly as claimed in claim 10 including the steps of:

forming nonmagnetic electrically nonconductive first and second read gap layers with the magnetoresistive sensor located therebetween; and forming ferromagnetic first and second shield layers with the first and second read gap layers located therebetween.

12. A method of a making magnetic head assembly as claimed in claim 11 further comprising the steps of:

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and pole piece layers at said back gap region.

13. A method as claimed in claim 12 wherein the free layer is formed between the AP pinned layer structure and the first pole piece layer.

14. A method as claimed in claim 12 wherein the AP pinned layer structure is formed between the free layer and the first pole piece layer.

* * * * *